Patented Sept. 5, 1922.

1,428,197

UNITED STATES PATENT OFFICE.

ALBERT WOLFF, OF HAMBURG, GERMANY, ASSIGNOR, BY MESNE ASSIGNMENTS, TO THE CHEMICAL FOUNDATION, INC., A CORPORATION OF DELAWARE.

PROCESS OF CLEANING SULPHONIC ACID.

No Drawing. Application filed April 20, 1916. Serial No. 92,523.

*To all whom it may concern:*

Be it known that I, Dr. ALBERT WOLFF, chemist, subject of the King of Prussia, residing at Hamburg, Germany, Claudiusstrasse 23, have invented certain new and useful Improvements in a Process for Cleaning Sulphonic Acids, of which the following is a specification.

The present application for Letters Patent relates to a process for the separation and purification of the sulphonic acids resulting from the known treatment of mineral oils with sulphuric acid, and my invention has for its particular object the preparation of these sulphonic acids in a state as free as possible from ash-forming substances.

The sulphonic acids have usually been separated, heretofore, by washing the acidulated mineral oils, after the elimination of the acid tar, with a mixture of alcohol and soda lye, whereby the sulphonic acids pass into the waste lye in the form of their alkali-metal salts. From this waste lye the sulphonic acids are separated, after suitable elimination of the dissolved mineral oil and the evaporation of the excess of solvent (alcohol), by the addition of mineral acids. In this operation the sulphonic acids are obtained as a separate layer, in spite of their solubility in water, as they are not dissolved by the aqueous solution of the salts. However, the layer of sulphonic acids contains a certain percentage of dissolved salts, the presence of which is objectionable when the sulphonic acids are used for certain purposes, especially for the saponification of fats in connection with the reaction itself, and undesirable on account of the increase of ash-forming substances in the glycerine.

It has already been proposed to extract the sulphonic acids from the acidulated mineral oils without the addition of alkali, viz., by washing the mineral oils repeatedly with small quantities of water. In this way it is possible to obtain the sulphonic acids free from ash-forming substances such as salts of mineral acid. This process is, however, objectionable, inasmuch as, with water only, not all the sulphonic acids may be withdrawn from the oil, the oil remaining therefore acid, and the yield of sulphonic acids being comparatively unsatisfactory. In consequence of this circumstance it becomes necessary, even in the case of repeated washing with small quantities of water, to free the oil from acid by a final washing with lye.

Now, for the purpose of obtaining the sulphonic acids free from ash-forming substances, I return to the known, approved and simple process of washing the acidulated oil with lyes, freeing thus, in an effective and simple manner, the oil from acids and causing the whole amount of the sulphonic acids to pass into the waste lye, wherefrom they are obtained in known manner.

For the purpose of removing the salts still contained in the sulphonic acids, it has proved, according to my experience, very satisfactory to submit the sulphonic acids containing salts, to a further washing with a mineral acid, such as sulphuric acid, in which the sulphonic acids are practically insoluble.

On account of the solubility of the sulphonic acids in water it is impracticable to carry out any washing with water. However, I have ascertained that the sulphonic acid is insoluble in dilute sulphuric acid, so that the sulphonic acids may be readily freed from salts by simply washing the sulphonic acid mixture one or more times with dilute sulphuric acid. By way of example, the sulphonic acids may be completely freed from salts by washing them with dilute sulphuric acid (40–50%) at a temperature of 140° F.

It has, furthermore, been shown by experiments that a sulphonic acid which originally contained 9,8% of ash-forming substances washed once with 20% of a solution of sulphuric acid (25%), turned out to contain only 3,5% of ash forming substances; washed twice, it contains only 1% and washed thrice it contained only 0,17%. This considerable diminution of the content of ash-forming substances of sulphonic acid is of considerable importance, as will clearly be seen from the following figures:

The above-mentioned acid with a content of ash-forming substances of 9,8%, employed in a quantity of 0,4%, with reference to an acid of 100% will saponify in 10 hours 62% of beef-tallow and in 14 hours 72% of beef-tallow.

The sulphonic acid, cleaned by a single washing so as to contain only 3,5% of ash-forming substances, will saponify in 10 hours 70% and in 14 hours 76% of beef tallow whereas the acid, cleaned by a double washing so as to contain about 1% of ash-forming substances, will saponify in 10 hours 79% and in 14 hours 91% of beef tallow.

I claim as my invention:—

1. The process for removing the inorganic salts from sulphonic acids obtained from the treatment of mineral oils with sulphuric acid, which comprises repeatedly washing the salt-containing sulphonic acid with about 20 per cent, based on the weight of sulphonic acids treated, of about a 25 per cent sulphuric acid.

2. The process for removing inorganic salts from sulphonic acids obtained by the treatment of mineral oils with sulphuric acid, which comprises washing the salt-containing sulphonic acid with about 20%, based on the weight of sulphonic acids treated, of sulphuric acid of about 40% to 50% strength at a temperature above 100° F.

3. The process for removing inorganic salts from sulphonic acids obtained by the treatment of mineral oils with sulphuric acid, which comprises washing the salt-containing sulphonic acid with about 20%, based on the weight of sulphonic acids treated, of sulphuric acid of about 40% to 50% strength, at a temperature of about 140° F.

In testimony whereof I affix my signature in presence of two witnesses.

Dr. ALBERT WOLFF.

Witnesses:
  FRANCIS R. STEWART,
  M. BRINKMAN.